(12) United States Patent
Sivakumar et al.

(10) Patent No.: US 12,411,498 B2
(45) Date of Patent: Sep. 9, 2025

(54) MISSION CRITICAL DATA DELIVERY BOOSTER DRONES FOR SATELLITE DATA CENTERS

(71) Applicant: International Business Machines Corporation, Armonk, NY (US)

(72) Inventors: Gandhi Sivakumar, Bentleigh (AU); Kushal S. Patel, Pune (IN); Sarvesh S. Patel, Pune (IN)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 18/067,118

(22) Filed: Dec. 16, 2022

(65) Prior Publication Data
US 2024/0201694 A1    Jun. 20, 2024

(51) Int. Cl.
*G05D 1/00* (2024.01)
*B64C 39/02* (2023.01)
*B64U 10/00* (2023.01)
*H04W 12/088* (2021.01)
*B64U 101/60* (2023.01)

(52) U.S. Cl.
CPC ........... *G05D 1/104* (2013.01); *B64C 39/024* (2013.01); *B64U 10/00* (2023.01); *G05D 1/0027* (2013.01); *H04W 12/088* (2021.01); *B64U 2101/60* (2023.01); *B64U 2201/20* (2023.01)

(58) Field of Classification Search
CPC .. B64C 39/024; B64U 10/00; B64U 2101/60; B64U 2201/20; H04W 12/088; G08G 5/00
USPC .......................................................... 701/2
See application file for complete search history.

(56) References Cited

U.S. PATENT DOCUMENTS

| 7,542,829 B2* | 6/2009 | Lee ........................ B64G 1/24 342/357.73 |
| 12,080,024 B2* | 9/2024 | Arksey ................ G05D 1/0027 |

FOREIGN PATENT DOCUMENTS

| CN | 108419286 B | 4/2020 |
| KR | 102345374 B1 | 12/2021 |

OTHER PUBLICATIONS

Condon, Stephanie, "CES 2019: Verizon showcases the potential of 5G with drones, Disney and more", ZDNet, Jan. 8, 2019, 7 Pages.
(Continued)

*Primary Examiner* — Shardul D Patel
(74) *Attorney, Agent, or Firm* — Michael A. Petrocelli

(57) ABSTRACT

In an approach for amplifying a mission critical workload to a low Earth orbit (LEO) satellite using a booster drone, responsive to receiving a first request to amplify a mission critical workload to a LEO satellite, a processor initiates a targeted service instance. A processor obtains a level of mission criticality of the first request by mapping the first request against a registry of applications and a respective level of mission criticality of the applications. A processor selects a booster drone from a drone delivery station. A processor determines a first geo-location from where a satellite data communication needs to be initiated. A processor determines a second geo-location of the LEO satellite to where the satellite data communication needs to be pushed. A processor generates one or more signal strength requirements. A processor amplifies the mission critical workload according to the one or more generated signal strength requirements.

20 Claims, 6 Drawing Sheets

(56) References Cited

OTHER PUBLICATIONS

Mehar, Pranjal, "Nasa is about to test a giant solar drone that broadcasts 5G", Tech Explorist, Mar. 9, 2019, 3 Pages.

Messous et al., "Edge Computing for Visual Navigation and Mapping in a UAV Network", ICC 2020—2020 IEEE International Conference on Communications (ICC), Dublin, Ireland, Jun. 7-11, 2020, 6 Pages.

Patel, Nikunj, "The Sky Is the Limit in 5G Game of Drones", eInfochips, Dec. 11, 2019, 3 Pages.

Samsung, "Samsung, Cisco and Orange Demonstrate 5G-Powered Drone and Industrial Robot at MWC19", Samsung Newsroom, Feb. 26, 2019, 5 Pages.

Tasevski, Stefan, "5G and Drones", Drone Below, Aug. 31, 2018, 2 Pages.

Zhang et al., "Air-Ground Integrated Mobile Edge Networks: A Survey", IEEE Access, vol. 8, Jul. 9, 2020, 21 Pages.

* cited by examiner

MISSION CRITICAL DATA DELIVERY BOOSTER DRONES FOR SATELLITE DATA CENTERS

BACKGROUND OF THE INVENTION

The present invention relates generally to the field of data processing, and more particularly to mission critical data delivery booster drones for satellite data centers.

An aerial drone, also known as an unmanned aerial vehicle (UAV) or a flying drone, is an unmanned airborne vehicle that is capable of being piloted without an on-board human pilot. If autonomously controlled using an on-board computer and pre-programmed instructions, a UAV is called an autonomous drone. If remotely piloted by a human pilot, a UAV is called a remotely piloted aircraft (RPA).

A UAV is most often associated with the military. UAVs were initially used for anti-aircraft target practice, intelligence gathering, and as weapons platforms. UAVs are now also used in a range of civilian roles, including search and rescue missions, surveillance, traffic monitoring, weather monitoring, firefighting, personal use, drone-based photography, videography, agriculture, and delivery services.

A satellite constellation is a group of artificial satellites working together as a system. Unlike a single satellite, a satellite constellation can provide permanent global or near global coverage, such that at any time everywhere on Earth at least one satellite is visible. Satellites are typically placed in sets of complementary orbital planes and connect to globally distributed ground stations. They may also use inter-satellite communications.

SUMMARY

Aspects of an embodiment of the present invention disclose a method, computer program product, and computer system for amplifying a mission critical workload to a low Earth orbit satellite using a booster drone. Responsive to receiving a first request to amplify a mission critical workload to a low earth orbit satellite, a processor initiates a targeted service instance. A processor obtains a level of mission criticality of the first request by mapping the first request against a registry of applications and a respective level of mission criticality of the applications. A processor selects a booster drone from a drone delivery station. A processor determines a first geo-location from where a satellite data communication needs to be initiated. Responsive to the booster drone reaching the first geo-location, a processor determines a second geo-location of the low Earth orbit satellite to where the satellite data communication needs to be pushed. A processor generates one or more signal strength requirements based on a first set of factors. A processor amplifies the mission critical workload according to the one or more generated signal strength requirements.

In some aspects of an embodiment of the present invention, the drone delivery station comprises a plurality of booster drones polling for the first request.

In some aspects of an embodiment of the present invention, the booster drone is selected from the drone delivery station based on an availability of the booster drone.

In some aspects of an embodiment of the present invention, a processor initiates a connector channel. A processor identifies a second set of factors involved in the determination of the second geo-location of the low Earth orbit satellite.

In some aspects of an embodiment of the present invention, the second set of factors involved in a determination of the second geo-location of the low Earth orbit satellite are selected from a group consisting of: a measurement of speed with respect to a position of Earth, one or more direction vectors, and a weightage of the one or more direction vectors.

In some aspects of an embodiment of the present invention, the first set of factors used in a generation of the one or more signal strength requirements are selected from a group consisting of: a distance calculated between the first geo-location from where the satellite data communication needs to be initiated and the second geo-location of the low Earth orbit satellite to where the satellite data communication needs to be pushed; a reception capability; and a signal-to-noise ratio.

In some aspects of an embodiment of the present invention, subsequent to generating the one or more signal strength requirements based on the first set of factors, a processor determines the third geo-location of the booster drone based on a third set of factors.

In some aspects of an embodiment of the present invention, the third set of factors used in a determination of the third geo-location of the booster drone are selected from a group consisting of: a height at which the booster drone is positioned, a location at which the booster drone is positioned, and a transmitter directional moment of the booster drone.

In some aspects of an embodiment of the present invention, a processor creates a tunnel of 5G Dedicated Traffic Channel for a secured data communication transfer method. A processor sends the mission critical workload to the second geo-location of the low Earth orbit satellite.

In some aspects of an embodiment of the present invention, subsequent to sending the mission critical workload to the second geo-location of the low Earth orbit satellite, a processor monitors an input data stream for a determination of validity of the mission critical workload sent to the second geo-location of the low Earth orbit satellite.

In some aspects of an embodiment of the present invention, a processor sends a signal from a service orchestration layer to one or more stakeholders. Responsive to the signal being received by the one or more stakeholders, a processor transfers an edge device to a static transmission line. A processor dissolves a logical channel.

In some aspects of an embodiment of the present invention, the one or more stakeholders are selected from a group consisting of: a Virtual Network Function, a service and programmability framework, the drone delivery station, and the booster drone.

In some aspects of an embodiment of the present invention, subsequent to a dissolution of the logical channel, a processor sends the booster drone to the drone delivery station. A processor changes a status of the booster drone to available to accept a second request to amplify a second mission critical workload to a second low Earth orbit satellite.

These and other features and advantages of the present invention will be described in, or will become apparent to those of ordinary skill in the art in view of, the following detailed description of the example embodiments of the present invention.

DETAILED DESCRIPTION

Figure 1:
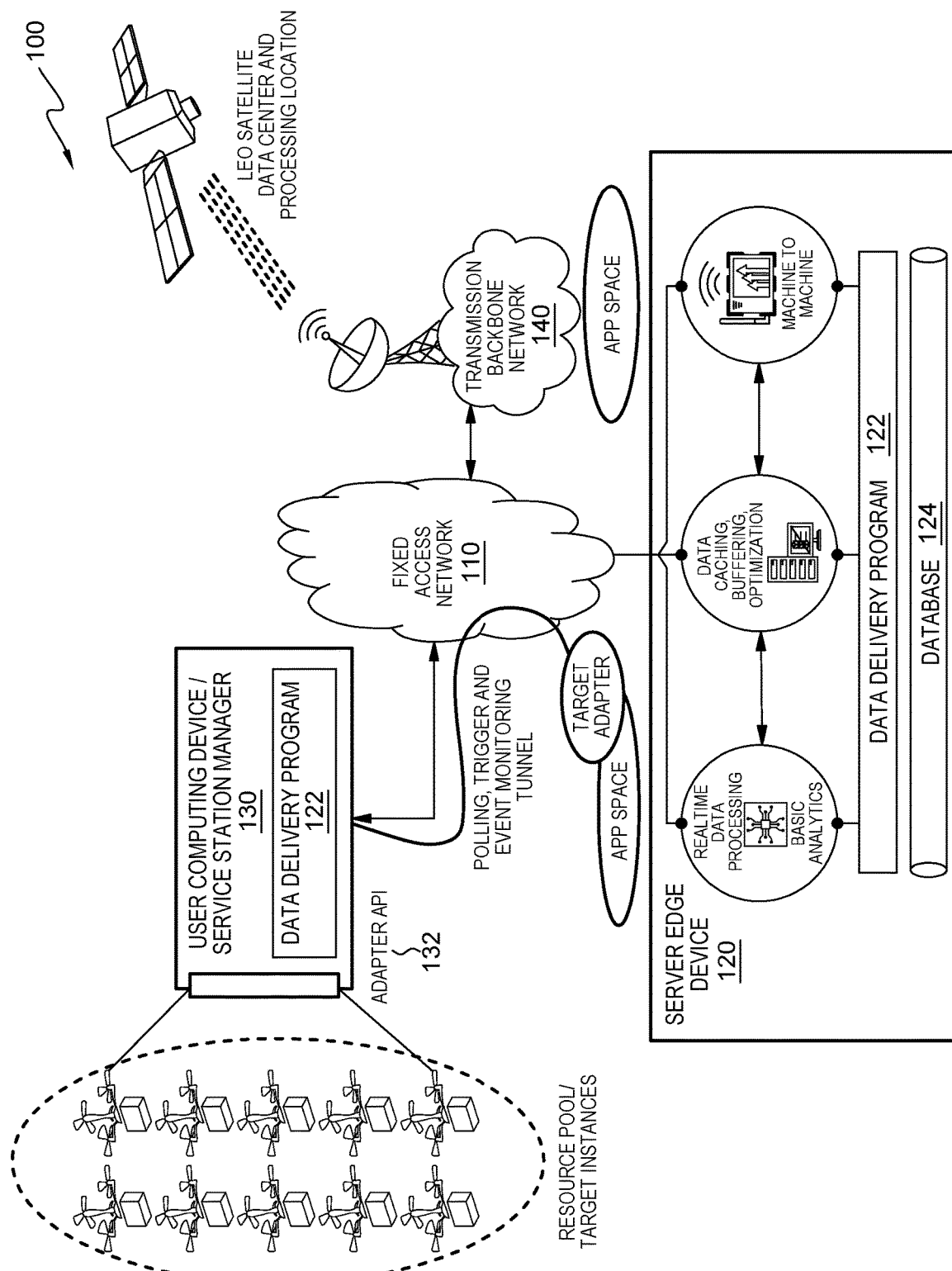
FIG. 1 is a functional block diagram illustrating a distributed data processing environment, in accordance with an embodiment of the present invention.

Embodiments of the present invention recognize that large commercial satellite constellations, colloquially nicknamed "mega-constellations," are a group of man-made satellites operating together to cover a vast span of the globe. Used for global communications coverage, satellite mega-constellations are present in the outer atmosphere of the planet and are connected to each other through the technology of inter-satellite communication. Satellite mega-constellations provide improved capabilities for satellite operators and enhanced services for terrestrial users. However, from the improved capabilities and enhanced services, satellite mega-constellations generate loads of data which need to be stored, processed, and analyzed.

Embodiments of the present invention recognize that the expansion of edge computing beyond traditional terrestrial network connections is driving direct connections between data centers and satellite broadband ground stations to reduce latency and increase application speeds.

Embodiments of the present invention recognize that a low Earth orbit (LEO) is an orbit that is relatively close to Earth's surface. It is normally at an altitude of less than 1000 km but could be as low as 160 km above Earth—which is low compared to other orbits, but still very far above Earth's surface. Unlike satellites in geostationary orbit (GEO) that must always orbit along Earth's equator, satellites in LEO do not always have to follow a particular path around Earth in the same way—their plane can be tilted. This means there are more available routes for satellites in LEO, which is one of the reasons why LEO is a very commonly used orbit. Additionally, since the satellites in LEO orbit the Earth at a reasonably closer distance, direct microwave transmission from user devices to satellites in LEO is possible.

Embodiments of the present invention recognize that drone technology uses aerial devices to serve various human needs, including, but not limited to, video surveillance control and goods delivery. The drones are unmanned aerial vehicles (UAVs) that typically use battery power to fly and wireless interconnect like WiFi to communicate with ground-based controller systems. With the enablement of IoT, the drones possess the capability to sense various information using input sensors placed on the body of the drones and transfer the stream of data collected by the sensors to connected controllers for further data processing. This includes communication with multiple computing resources including other drones that may combine to form a drone-network.

Embodiments of the present invention recognize that the enablement of LEO satellite datacenters and the mechanisms to send and receive data from LEO satellites provides a performance benefit to the applications and devices accessing data from LEO satellites directly. When a device is directly connected to a LEO satellite processing location, transmission latency is very low due to omitted interferences of intermediate network components. In case of coverage requirements for critical applications where data transmission and timely delivery is a must, the direct connection with a LEO satellite processing location will offer a lot of mission critical application benefits. One example of a mission critical application benefit is the assistance that can be provided during a remote medical operation happening with the help of advanced interaction applications where packet delays are not tolerated. In such cases, the direct connection with a LEO satellite processing location makes a significant difference in fulfilling requirements. However, because of the rapid movement of LEO satellites and the distance from Earth, there is a need for large distance microwave transmitters and still there are chances of signal loss due to added noise in the transmission line.

Embodiments of the present invention recognize that existing solutions have limitations. First, there are distance challenges when connecting an edge device to a LEO satellite which cause a signal to drop during wireless transmission. Second, since a LEO satellite revolves faster and, unlike a GEO satellite, its location with respect to Earth alters, there is a constant need to change transmission sites. Third, there is no way by which a booster drone can be positioned based on a signal-to-noise ratio to get guaranteed data transmission. These limitations may result in a low latency, high speed connectivity link for mission critical workloads. Therefore, embodiments of the present invention recognize the need for a system and method that comprises a drone-based signal amplifier, to work with LEO satellites, to identify the motion and direction of the LEO satellites with respect to Earth, and to position itself to offer signal boosting for the mission critical workloads from edge devices.

Embodiments of the present invention provide a system and method that comprises a drone delivery station with multiple booster drones polling for a request to amplify a mission critical workload. A user computing device and an edge device, having data delivery program 122 installed, will poll for an event of utilization of a mission critical workload. To poll for the event, the edge device maintains a registry of the applications and a respective level of mission criticality of the applications. The edge device maps an incoming request against the registry of applications and the respective level of mission criticality of the applications to obtain a level of mission criticality of the request. Once the level of mission criticality information is received, data delivery program 122 sends a trigger to the drone delivery station to select a booster drone. A desired location for the booster drone is inquired by the drone delivery station and, based on the response, the booster drone will fly to the desired location. Once the booster drone reaches the desired location, a communication handshake occurs between the booster drone and the edge device and a set of information about signaling is collected. The booster drone then determines the location of the satellite to where the satellite data communication needs to be pushed. The location of the satellite to where the satellite data communication needs to be pushed is determined by initiating a connector channel and by identifying a set of factors, including, but not limited to, a measurement of speed with respect to a position of Earth, one or more direction vectors, and a weightage of the one or more direction vectors. Based on the distance between the location where the satellite data communication needs to be initiated and where the satellite data communication needs to be pushed, signal strength requirements are generated. A reception capability and a signal-to-noise ratio (SNR) are also considered when generating the signal strength requirements. The booster drone is positioned based on an ability of the edge device to avoid noise in the transmission of data and a set of factors, including, but not limited to, a height at which the booster drone is positioned, a location at which the booster drone is positioned, and a transmitter directional moment of the booster drone. A tunnel of 5G Dedicated Traffic Channel (DTCH) is then created from the edge device from where the applications are initiated and between the parties for secured data commination. The booster drone identifies the movement of the LEO satellite and selects the transmitter location movement accordingly. Once the mission critical workload is sent to the endpoint, the receptor of the booster drone receives the signal, amplifies the signal according to the one or more signal strength requirements to avoid transmission noise, and then sends the signal to the LEO satellite. Since the information is sent to the booster drone first and then the booster drone sends a boosted signal, the signal is free of transmission noise. This reduces packet retransmission requirements. Additionally, this communication link has only one intermediate hop between the edge device and the LEO processing center, making this architecture best suited for mission critical workloads. Once the mission critical workloads are completed, then the booster drone flies back to the drone delivery station to wait for the next request.

Embodiments of the present invention recognize that the benefits of the system and method include the ability to dynamically sense a need for mission critical workload transmissions to LEO satellite locations based on collected input streams and to autonomously provision an additional booster drone for more coverage; the ability to offload the processing to a booster drone to reduce congestion at the edge device running mission critical applications; the ability to direct the link to the LEO satellite data center and processing locations to increase the data transmissions speed and to offer increased application speed; and the ability to provide dynamic capability to move the drone with the event in motion, thus achieving better coverage.

Implementation of embodiments of the present invention may take a variety of forms, and exemplary implementation details are discussed subsequently with reference to the Figures.

FIG. 1 is a block diagram illustrating a distributed data processing environment, generally designated 100, in accordance with an embodiment of the present invention. In the depicted embodiment, distributed data processing environment 100 includes server 120, user computing device 130, and transmission backbone network 140, interconnected over network 110. Distributed data processing environment 100 may include additional servers, computers, computing devices, and other devices not shown. The term "distributed" as used herein describes a computer system that includes multiple, physically distinct devices that operate together as a single computer system. FIG. 1 provides only an illustration of one embodiment of the present invention and does not imply any limitations with regards to the environments in which different embodiments may be implemented. Many modifications to the depicted environment may be made by those skilled in the art without departing from the scope of the invention as recited by the claims.

Network 110 (also referred to as "fixed access network 110") operates as a computing network that can be, for example, a telecommunications network, a local area network (LAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include data, voice, and video information. In general, network 110 can be any combination of connections and protocols that will support communications between server 120, user computing device 130, transmission backbone network 140, and other computing devices (not shown) within distributed data processing environment 100.

Server 120 (also referred to as "edge device 120") operates to run data delivery program 122 and to send and/or store data in database 124. In an embodiment, server 120 can send data from database 124 to user computing device 130 and transmission backbone network 140. In an embodiment, server 120 can receive data in database 124 from user computing device 130 and transmission backbone network 140. In one or more embodiments, server 120 can be a standalone computing device, a management server, a web server, a mobile computing device, or any other electronic device or computing system capable of receiving, sending, and processing data and capable of communicating with user computing device 130 and transmission backbone network 140 via network 110. In one or more embodiments, server 120 can be a computing system utilizing clustered computers and components (e.g., database server computers, application server computers, etc.) that act as a single pool of seamless resources when accessed within distributed data processing environment 100, such as in a cloud computing environment. In one or more embodiments, server 120 can be a laptop computer, a tablet computer, a netbook computer, a personal computer, a desktop computer, a personal digital assistant, a smart phone, or any programmable electronic device capable of communicating with user computing device 130, transmission backbone network 140, and other computing devices (not shown) within distributed data processing environment 100 via network 110. Server 120 may include internal and external hardware components, as depicted and described in further detail in FIG. 6.

Data delivery program 122 operates to amplify a drone-based signal by identifying a motion and a direction of a LEO satellite with respect to the position of Earth and then by offering a signal boost for a mission critical workload from an edge device. In the depicted embodiment, data delivery program 122 is a standalone program. In another embodiment, data delivery program 122 may be integrated into another software product. In the depicted embodiment, data delivery program 122 resides on server 120 and user computing device 130. In another embodiment, data delivery program 122 may reside on another computing device (not shown), provided that data delivery program 122 has access to network 110.

In an embodiment, the user of user computing device 130 registers with data delivery program 122 of server 120. For example, the user completes a registration process (e.g., user validation), provides information to create a user profile, and authorizes the collection, analysis, and distribution (i.e., opts-in) of relevant data on identified computing devices (e.g., on user computing device 130) by server 120 (e.g., via data delivery program 122). Relevant data includes, but is not limited to, personal information or data provided by the user or inadvertently provided by the user's device without the user's knowledge; tagged and/or recorded location information of the user (e.g., to infer context (i.e., time, place, and usage) of a location or existence); time stamped temporal information (e.g., to infer contextual reference points); and specifications pertaining to the software or hardware of the user's device. In an embodiment, the user opts-in or opts-out of certain categories of data collection. For example, the user can opt-in to provide all requested information, a subset of requested information, or no information. In one example scenario, the user opts-in to provide time-based information, but opts-out of providing location-based information (on all or a subset of computing devices associated with the user). In an embodiment, the user opts-in or opts-out of certain categories of data analysis. In an embodiment, the user opts-in or opts-out of certain categories of data distribution. Such preferences can be stored in database 124.

Figure 2:
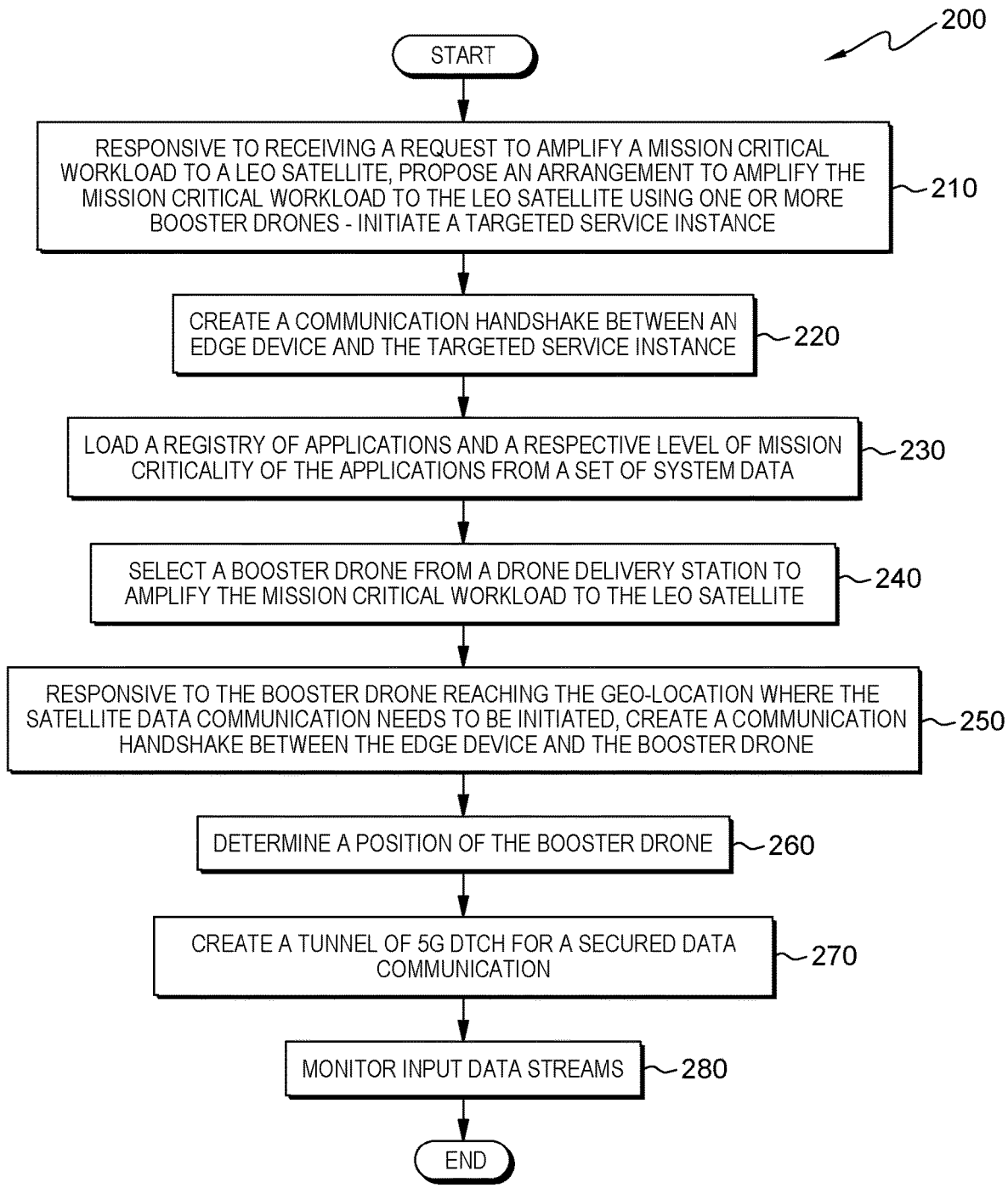
FIG. 2 is a flowchart illustrating the operational steps of a data delivery program, on a server within the distributed data processing environment of FIG. 1, in accordance with an embodiment of the present invention.

The operational steps of data delivery program 122 are depicted and described in further detail with respect to FIG. 2. An exemplary diagram illustrating a selection of a booster drone to amplify a mission critical workload to a LEO satellite (e.g., step 240) is depicted and described in further detail with respect to FIG. 3. An exemplary diagram illustrating a determination of a position of the booster drone (e.g., step 260) is depicted and described in further detail with respect to FIG. 4. An exemplary diagram illustrating a determination of a degree of validity of an event (e.g., step 280) is depicted and described in further detail with respect to FIG. 5.

Database 124 operates as a repository for data received, used, and/or generated by data delivery program 122. A database is an organized collection of data. Data includes, but is not limited to, information about user preferences (e.g., general user system settings such as alert notifications for user computing device 130); information about alert notification preferences; and any other data received, used, and/or generated by data delivery program 122.

Database 124 can be implemented with any type of device capable of storing data and configuration files that can be accessed and utilized by server 120, such as a hard disk drive, a database server, or a flash memory. In an embodiment, database 124 is accessed by data delivery program 122 to store and/or to access the data. In the depicted embodiment, database 124 resides on server 120. In another embodiment, database 124 may reside on another computing device, server, cloud server, or spread across multiple devices elsewhere (not shown) within distributed data processing environment 100, provided that data delivery program 122 has access to database 124.

The present invention may contain various accessible data sources, such as database 124, that may include personal and/or confidential company data, content, or information the user wishes not to be processed. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal and/or confidential company data. Data delivery program 122 enables the authorized and secure processing of personal data.

Data delivery program 122 provides informed consent, with notice of the collection of personal and/or confidential data, allowing the user to opt-in or opt-out of processing personal and/or confidential data. Consent can take several forms. Opt-in consent can impose on the user to take an affirmative action before personal and/or confidential data is processed. Alternatively, opt-out consent can impose on the user to take an affirmative action to prevent the processing of personal and/or confidential data before personal and/or confidential data is processed. Data delivery program 122 provides information regarding personal and/or confidential data and the nature (e.g., type, scope, purpose, duration, etc.) of the processing. Data delivery program 122 provides the user with copies of stored personal and/or confidential company data. Data delivery program 122 allows the correction or completion of incorrect or incomplete personal and/or confidential data. Data delivery program 122 allows for the immediate deletion of personal and/or confidential data.

User computing device 130 (also referred to as "service station manager 130") operates to run data delivery program 122 and user interface 132 (also referred to as "adapter API 132"), respectively, through which a user can interact with data delivery program 122 on server 120. In an embodiment, user computing device 130 is a device that performs programmable instructions. For example, user computing device 130 may be an electronic device, such as a laptop computer, a tablet computer, a netbook computer, a personal computer, a desktop computer, a smart phone, or any programmable electronic device capable of running the respective user interface 132 and of communicating (i.e., sending and receiving data) with data delivery program 122 via network 110. In general, user computing device 130 represents any programmable electronic device or a combination of programmable electronic devices capable of executing machine readable program instructions and communicating with other computing devices (not shown) within distributed data processing environment 100 via network 110. In the depicted embodiment, user computing device 130 includes an instance of data delivery program 122 and user interface 132.

User interface 132 operates as a local user interface between data delivery program 122 on server 120 and/or user computing device 130 and a user of user computing device 130. In some embodiments, user interface 132 is a graphical user interface (GUI), a web user interface (WUI), and/or a voice user interface (VUI) that can display (i.e., visually) or present (i.e., audibly) text, documents, web browser windows, user options, application interfaces, and instructions for operations sent from data delivery program 122 to a user via network 110. User interface 132 can also display or present alerts including information (such as graphics, text, and/or sound) sent from data delivery program 122 to a user via network 110. In an embodiment, user interface 132 is capable of sending and receiving data (i.e., to and from data delivery program 122 via network 110, respectively). Through user interface 132, a user can opt-in to data delivery program 122; create a user profile; set user preferences and alert notification preferences; receive a request for feedback; and input feedback.

A user preference is a setting that can be customized for a particular user. A set of default user preferences are assigned to each user of data delivery program 122. A user preference editor can be used to update values to change the default user preferences. User preferences that can be customized include, but are not limited to, general user system settings, specific user profile settings, alert notification settings, and machine-learned data collection/storage settings. Machine-learned data is a user's personalized corpus of data.

Machine-learned data includes, but is not limited to, past results of iterations of data delivery program 122.

FIG. 2 is a flowchart, generally designated 200, illustrating the operational steps for data delivery program 122, on server 120 within distributed data processing environment 100 of FIG. 1, in accordance with an embodiment of the present invention. In an embodiment, data delivery program 122 operates to amplify a drone-based signal by identifying a motion and a direction of a low Earth orbit (LEO) satellite with respect to the position of Earth and then by offering a signal boost for a mission critical workload from an edge device. It should be appreciated that the process depicted in FIG. 2 illustrates one possible iteration of the process flow, which may be repeated each time a request to amplify a mission critical workload to a low Earth orbit (LEO) satellite is detected.

In step 210, data delivery program 122 polls for a first request to amplify a mission critical workload to a LEO satellite (i.e., an event). In an embodiment, responsive to receiving the request to amplify the mission critical workload to the LEO satellite, data delivery program 122 initiates a targeted service instance. In another embodiment, responsive to detecting a need to amplify the mission critical workload to the LEO satellite, data delivery program 122 initiates a targeted service instance. In an embodiment, data delivery program 122 initiates a targeted service instance via a service station manager (e.g., user computing device 130/service station manager 130) of a drone delivery station. The drone delivery station is comprised of a plurality of booster drones waiting to be initiated (i.e., waiting to be triggered). In an embodiment, data delivery program 122 communicates with the drone delivery station to inquire about a status and/or a geo-location of the plurality of booster drones. In an embodiment, data delivery program 122 proposes an arrangement to amplify the mission critical workload to the LEO satellite using one or more booster drones from the plurality of booster drones. In an embodiment, data delivery program 122 loads one or more data structures onto the targeted service instance. In an embodiment, data delivery program 122 triggers a defined set of data collection resources to send to one or more data streams. In an embodiment, data delivery program 122 identifies one or more receiver data locations (i.e., one or more resource capitals). In an embodiment, data delivery program 122 provisions the one or more receiver data locations (i.e., the one or more resource capitals) using an insertion to a softwarization management plan. In an embodiment, data delivery program 122 triggers one or more Virtual Network Functions to start the transmission of data. In an embodiment, data delivery program 122 initiates one or more Interconnect API instances. In an embodiment, data delivery program 122 performs a handshake to transmit a data requirement signal and a recognition of an event by an orchestration plane.

In step 220, data delivery program 122 creates a communication handshake. In an embodiment, data delivery program 122 creates a communication handshake between an edge device (e.g., edge device 120) and the targeted service instance. In an embodiment, data delivery program 122 creates a communication handshake using at least one of an In-band API and an OOBand API. In an embodiment, data delivery program 122 polls for one or more requirements of the event (i.e., the amplification of the mission critical workload to the LEO satellite). In an embodiment, data delivery program 122 polls for one or more wake threads of the event (i.e., the amplification of the mission critical workload to the LEO satellite). In some embodiments, data delivery program 122 monitors the PLMQ for the interrupt for the event (i.e., the amplification of the mission critical workload to the LEO satellite).

In step 230, data delivery program 122 loads a registry of applications and a respective level of mission criticality of the applications from a set of system data stored in an edge device (e.g., edge device 120). In an embodiment, data delivery program 122 obtains a level of mission criticality of the request to amplify the mission critical workload to the LEO satellite. In an embodiment, data delivery program 122 obtains a level of mission criticality of the request by mapping the request against the registry of applications and the respective level of mission criticality of the applications. In an embodiment, data delivery program 122 maps the request (i.e., the requestion identifier (i.e., APP_PID)) against the registry of applications and the respective level of mission criticality of the applications. In an embodiment, responsive to obtaining the respective level of mission criticality of the request, data delivery program 122 sends a trigger to the service station manager (e.g., user computing device 130/service station manager 130) of the drone delivery station to select a booster drone (also referred to as a "worker drone") from the drone delivery station to amplify the mission critical workload to the LEO satellite.

In step 240, data delivery program 122 selects a booster drone from the drone delivery station to amplify the mission critical workload to the LEO satellite. In an embodiment, data delivery program 122 selects a booster drone based on availability. In an embodiment, data delivery program 122 inquires of a geo-location (also referred to as a "desired location") from where a satellite data communication needs to be initiated from the edge device (e.g., edge device 120). In an embodiment, responsive to receiving the geo-location, data delivery program 122 instructs the booster drone to move to the geo-location where the satellite data communication needs to be initiated. In an embodiment, data delivery program 122 sends the booster drone to the geo-location where the satellite data communication needs to be initiated. An exemplary diagram illustrating the selection of the booster drone is depicted and described in further detail with respect to FIG. 3.

In step 250, responsive to the booster drone reaching the geo-location where the satellite data communication needs to be initiated, data delivery program 122 creates a communication handshake between the edge device (e.g., edge device 120) and the booster drone. In an embodiment, data delivery program 122 collects a set of information about signaling from the communication handshake between the edge device and the booster drone. In an embodiment, data delivery program 122 determines a geo-location of the LEO satellite to where the satellite data communication needs to be pushed. In an embodiment, data delivery program 122 determines the geo-location of the LEO satellite by initiating a connector channel (i.e., a dedicated traffic channel (DTCH)). In an embodiment, data delivery program 122 determines the geo-location of the LEO satellite by identifying a set of factors. The set of factors may include, but are not limited to, a measurement of speed with respect to a position of Earth, one or more direction vectors, and a weightage of the one or more direction vectors. In an embodiment, data delivery program 122 generates one or more signal strength requirements between a booster drone and the LEO satellite. In an embodiment, data delivery program 122 generates one or more signal strength requirements based on a set of factors. The set of factors may include, but are not limited to, a distance calculated between the geo-location from where the satellite data communication needs to be initiated and the geo-location of the low earth orbit satellite to where the satellite data communication needs to be pushed; a reception capability; and a signal-to-noise ratio (SNR).

In step 260, data delivery program 122 determines a position of the booster drone. In an embodiment, data delivery program 122 determines a position of the booster drone based on an ability of the edge device (e.g., edge device 120) to avoid noise in the transmission of data. In an embodiment, data delivery program 122 determines a position of the booster drone based on a set of factors. The set of factors may include, but are not limited to, a height at which the booster drone is positioned, a location at which the booster drone is positioned, and a transmitter directional moment of the booster drone. In an embodiment, data delivery program 122 inquires of the capability of the edge device (e.g., edge device 120). In an embodiment, data delivery program 122 inquires of the capability of the receptors of the booster drone. In an embodiment, responsive to determining the position of the booster drone, data delivery program 122 properly positions the booster drone. An exemplary diagram illustrating the determination of the position of the booster drone is depicted and described in further detail with respect to FIG. 4.

In step 270, data delivery program 122 creates a tunnel of 5G DTCH for a secured data communication transfer method. In an embodiment, data delivery program 122 creates a tunnel of 5G DTCH from the edge device (e.g., edge device 120) where the application is initiated to the parties of the secured data communication. In an embodiment, data delivery program 122 enables the booster drone to identify the movement of the LEO satellite. In an embodiment, data delivery program 122 enables the booster drone to select the transmitter location based on the movement of the LEO satellite. In an embodiment, responsive to sending the mission critical workload to the endpoint (i.e., the parties of the secured data communication), data delivery program 122 enables the receptor of the booster drone to receive the signal. In an embodiment, data delivery program 122 enables the receptor of the booster drone to amplify the mission critical workload according to the one or more signal strength requirements to avoid transmission noise. In an embodiment, data delivery program 122 enables the receptor of the booster drone to send the signal to the LEO satellite.

In step 280, data delivery program 122 monitors the input data streams for a determination of validity of the event (i.e., the amplification of the mission critical workload to the LEO satellite). In an embodiment, responsive to the event ending, data delivery program 122 sends a signal from a service orchestration layer to one or more stakeholders. The one or more stakeholders may include, but are not limited to, a Virtual Network Function (VNF), a service and programmability framework, the drone delivery station, and the booster drone. In an embodiment, responsive to the signal being received by the one or more stakeholders, data delivery program 122 transfers the edge device back to a static transmission line for further data transmission. In an embodiment, data delivery program 122 dissolves a logical channel to free up resources. In an embodiment, responsive to dissolution of the logical channel, data delivery program 122 sends the booster drone back to the drone delivery station. In an embodiment, data delivery program 122 changes a status of the booster drone to available to accept a second request to amplify a second mission critical workload to a second LEO satellite. An exemplary diagram illustrating the determination of the degree of validity of the event is depicted and described in further detail with respect to FIG. 5.

Figure 3:
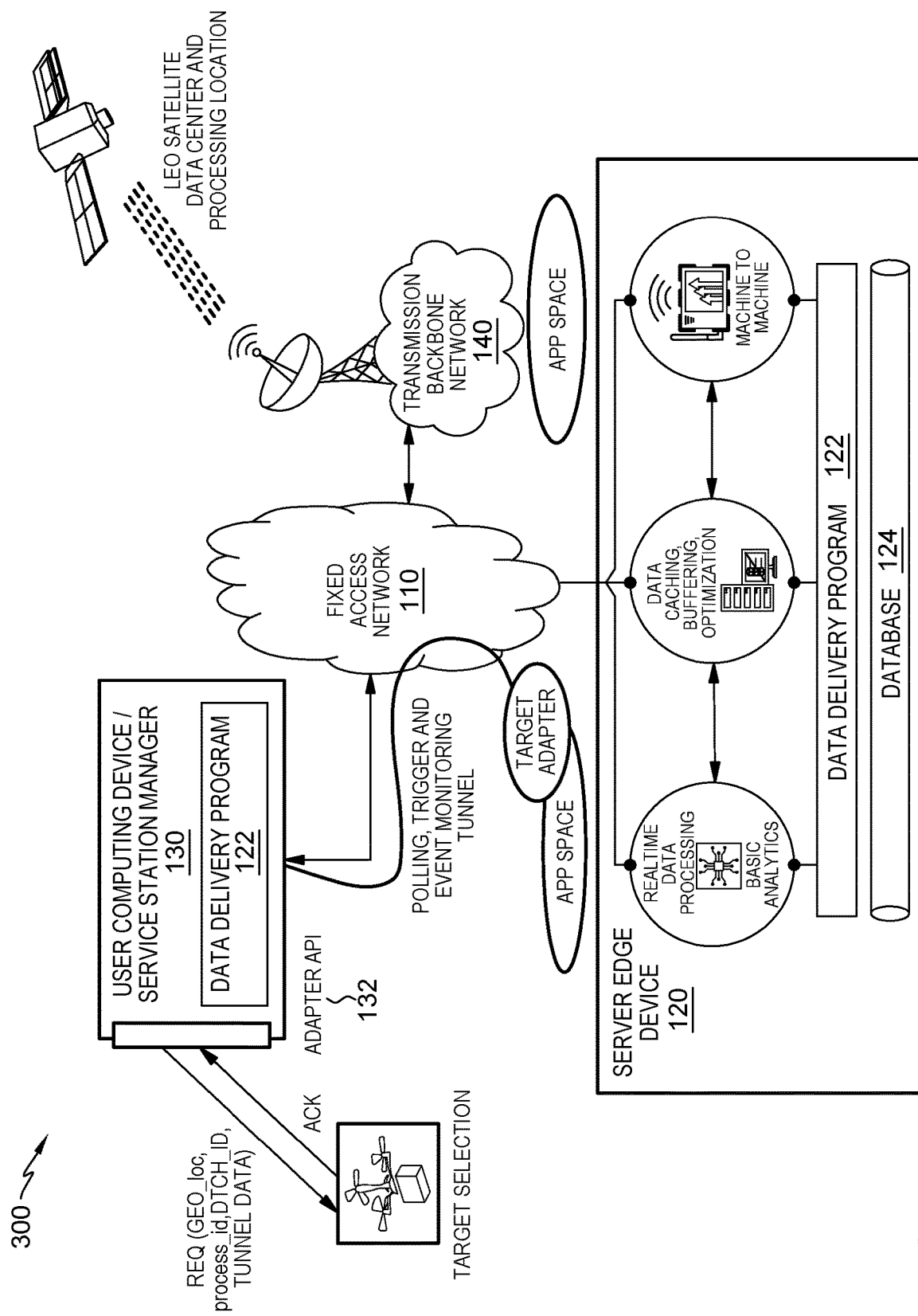
FIG. 3 is an exemplary diagram illustrating a selection of a booster drone to amplify a mission critical workload to a low Earth orbit satellite, on the server within the distributed data processing environment of FIG. 1, in accordance with an embodiment of the present invention.

FIG. 3 is an exemplary diagram, generally designated 300, illustrating a selection of the booster drone to amplify the mission critical workload to the LEO satellite (e.g., step 240), on server 120 within distributed data processing environment 100 of FIG. 1, in accordance with an embodiment of the present invention.

Figure 4:
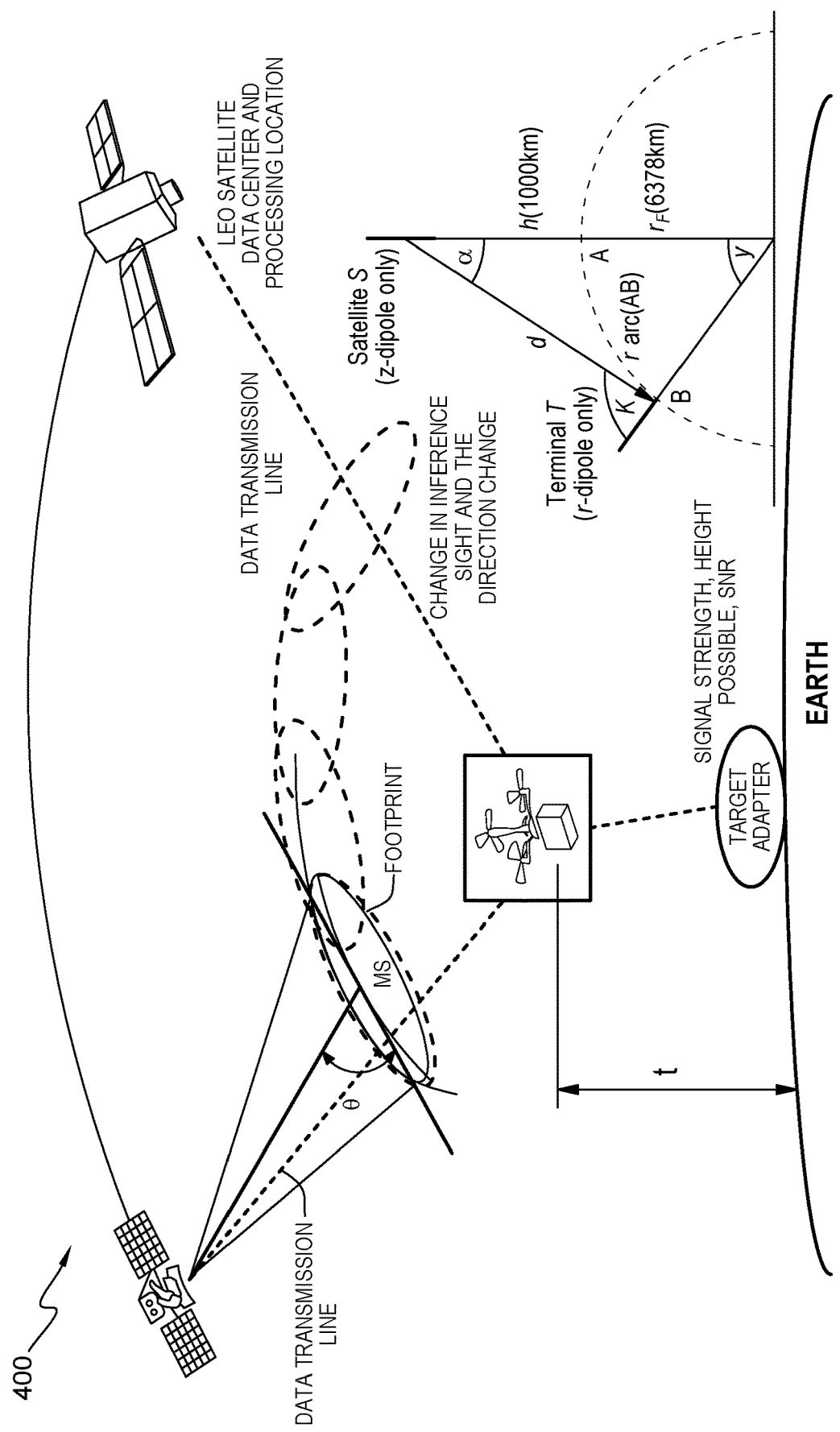
FIG. 4 is an exemplary diagram illustrating a determination of a position of the booster drone, on the server within the distributed data processing environment of FIG. 1, in accordance with an embodiment of the present invention.

FIG. 4 is an exemplary diagram, generally designated 400, illustrating a determination of the position of the booster drone (e.g., step 260), on server 120 within distributed data processing environment 100 of FIG. 1, in accordance with an embodiment of the present invention.

Figure 5:
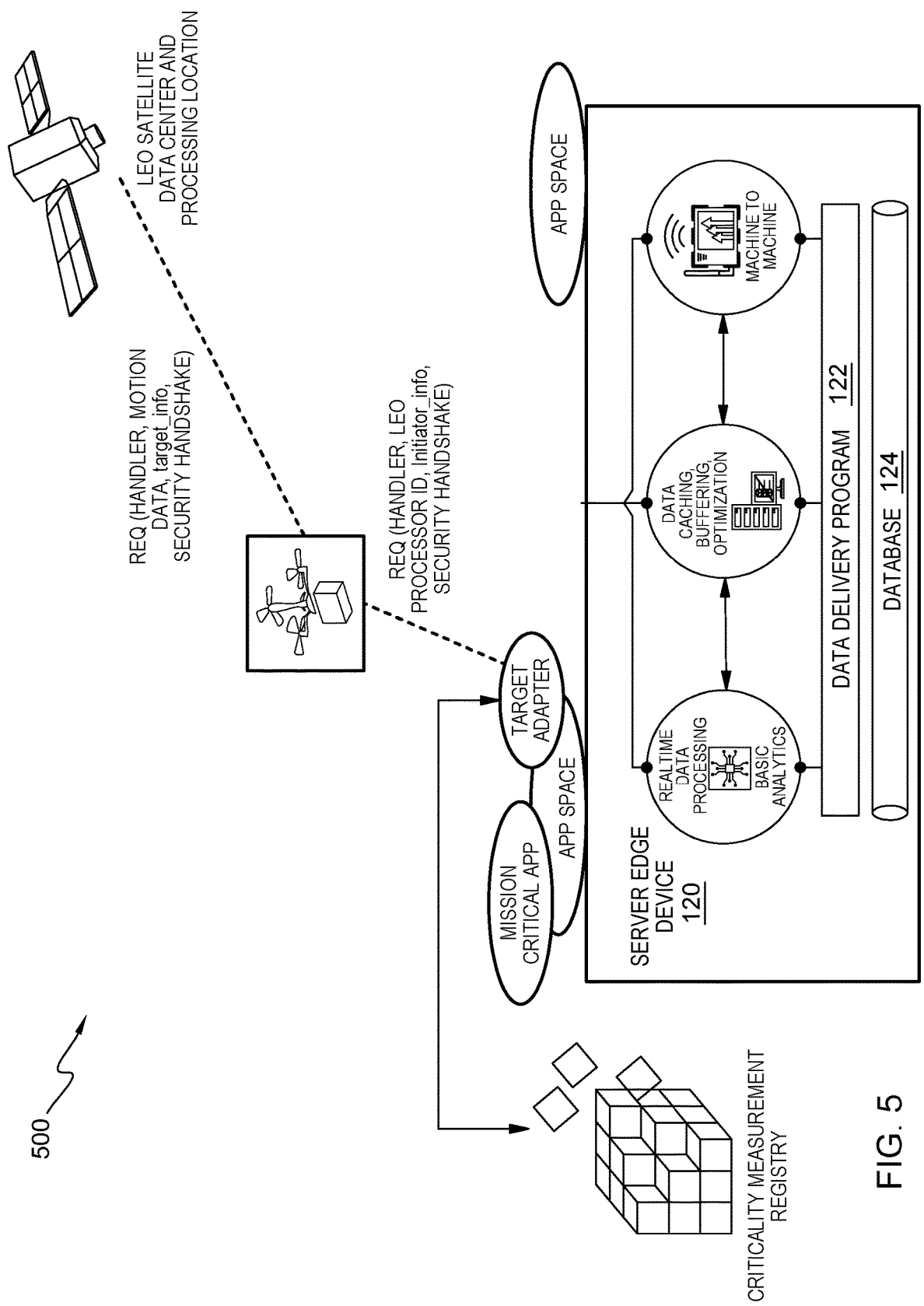
FIG. 5 is an exemplary diagram illustrating a determination of a degree of validity of an event, on the server within the distributed data processing environment of FIG. 1, in accordance with an embodiment of the present invention.

FIG. 5 is an exemplary diagram, generally designated 500, illustrating a determination of a degree of validity of an event (e.g., step 280), on server 120 within distributed data processing environment 100 of FIG. 1, in accordance with an embodiment of the present invention.

Figure 6:
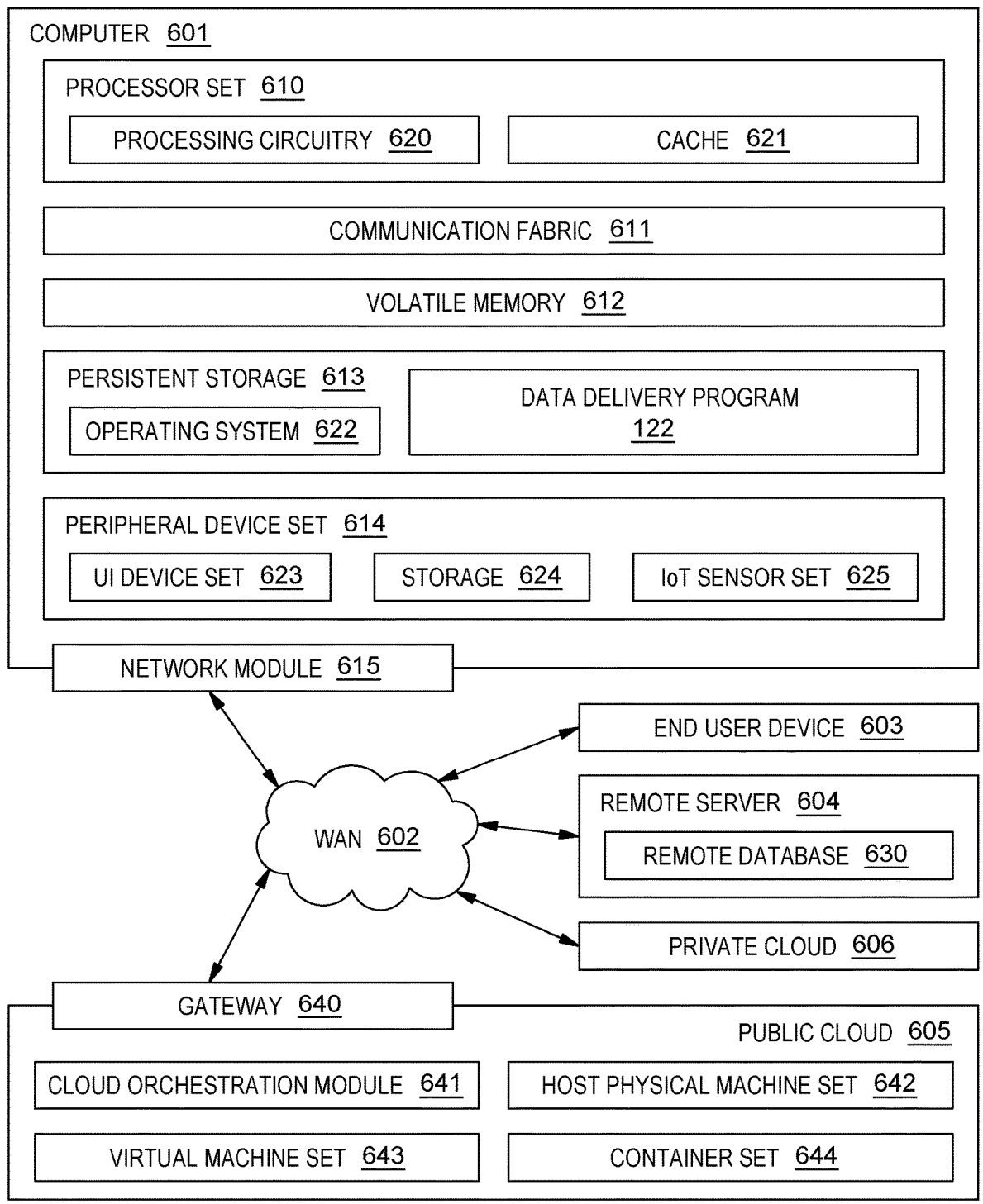
FIG. 6 depicts a block diagram of components of a computing environment representing the distributed data processing environment of FIG. 1, in accordance with an embodiment of the present invention.

FIG. 6 depicts a block diagram of components of server 120 within distributed data processing environment 100 of FIG. 1, in accordance with an embodiment of the present invention. It should be appreciated that FIG. 6 provides only an illustration of one implementation and does not imply any limitations with regard to the environments in which different embodiments can be implemented. Many modifications to the depicted environment can be made.

Computing environment 600 contains an example of an environment for the execution of at least some of the computer code involved in performing the inventive methods, such as data delivery program 122. In addition to data delivery program 122, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and data delivery program 122, as identified above), peripheral device set 614 (including user interface (UI), device set 623, storage 624, and Internet of Things (IOT) sensor set 625), and network module 615. Remote server 604 includes remote database 630. Public cloud 605 includes gateway 640, cloud orchestration module 641, host physical machine set 642, virtual machine set 643, and container set 644.

Computer 601, which represents server 120 of FIG. 1, may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

Processor set 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in data delivery program 122 in persistent storage 613.

Communication fabric 611 is the signal conduction paths that allow the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 612 is any type of volatile memory now known or to be developed in the future. Examples include dynamic type random access memory (RAM) or static type RAM. Typically, the volatile memory is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

Persistent storage 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid-state storage devices. Operating system 622 may take several forms, such as various known proprietary operating systems or open-source Portable Operating System Interface type operating systems that employ a kernel. The code included in data delivery program 122 typically includes at least some of the computer code involved in performing the inventive methods.

Peripheral device set 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

Network module 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 603 is any computer system that is used and controlled by an end user (for example, a customer of an enterprise that operates computer 601) and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

Remote server 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

Public cloud 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The foregoing descriptions of the various embodiments of the present invention have been presented for purposes of illustration and example but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
responsive to receiving a first request to amplify a mission critical workload to a low earth orbit satellite from an edge device at a ground station, initiating, by one or more processors, a targeted service instance;
obtaining, by the one or more processors, a level of mission criticality of the first request by mapping the first request against a registry of applications and a respective level of mission criticality of the applications;
selecting, by the one or more processors, a booster drone from a drone delivery station;
determining, by the one or more processors, a first geo-location from where a satellite data communication needs to be initiated;
sending the booster drone to the first geo-location;
responsive to the booster drone reaching the first geo-location, determining, by the one or more processors, a second geo-location of the low earth orbit satellite to where the satellite data communication needs to be pushed;
generating, by the one or more processors, one or more signal strength requirements based on a first set of factors; and
amplifying, by the one or more processors, using the booster drone, the mission critical workload according to the one or more generated signal strength requirements, to the low earth orbit satellite.

2. The computer-implemented method of claim 1, wherein the drone delivery station comprises a plurality of booster drones polling for the first request.

3. The computer-implemented method of claim 1, wherein the booster drone is selected from the drone delivery station based on an availability of the booster drone.

4. The computer-implemented method of claim 1, wherein determining the second geo-location of the low earth orbit satellite to where the satellite data communication needs to be pushed further comprises:
initiating, by the one or more processors, a connector channel; and
identifying, by the one or more processors, a second set of factors involved in the determination of the second geo-location of the low earth orbit satellite.

5. The computer-implemented method of claim 4, wherein the second set of factors involved in a determination of the second geo-location of the low earth orbit satellite are selected from a group consisting of: a measurement of speed with respect to a position of Earth, one or more direction vectors, and a weightage of the one or more direction vectors.

6. The computer-implemented method of claim 1, wherein the first set of factors used in a generation of the one or more signal strength requirements are selected from a group consisting of: a distance calculated between the first geo-location from where the satellite data communication needs to be initiated and the second geo-location of the low earth orbit satellite to where the satellite data communication needs to be pushed; a reception capability; and a signal-to-noise ratio.

7. The computer-implemented method of claim 1, further comprising:
subsequent to generating the one or more signal strength requirements based on the first set of factors, determining, by the one or more processors, the third geo-location of the booster drone based on a third set of factors.

8. The computer-implemented method of claim 7, wherein the third set of factors used in a determination of the third geo-location of the booster drone are selected from a group consisting of: a height at which the booster drone is positioned, a location at which the booster drone is positioned, and a transmitter directional moment of the booster drone.

9. The computer-implemented method of claim 1, wherein amplifying the mission critical workload according to the one or more generated signal strength requirements further comprises:
creating, by the one or more processors, a tunnel of 5G Dedicated Traffic Channel for a secured data communication transfer method; and
sending, by the one or more processors, the mission critical workload to the second geo-location of the low earth orbit satellite.

10. The computer-implemented method of claim 9, further comprising:
subsequent to sending the mission critical workload to the second geo-location of the low earth orbit satellite, monitoring, by the one or more processors, an input data stream for a determination of validity of the mission critical workload sent to the second geo-location of the low earth orbit satellite.

11. The computer-implemented method of claim 10, wherein monitoring the input data stream for the determination of the validity of the mission critical workload sent to the second geo-location of the low earth orbit satellite further comprises:
sending, by the one or more processors, a signal from a service orchestration layer to one or more stakeholders;
responsive to the signal being received by the one or more stakeholders, transferring, by the one or more processors, an edge device to a static transmission line; and
dissolving, by the one or more processors, a logical channel.

12. The computer-implemented method of claim 11, wherein the one or more stakeholders are selected from a group consisting of: a Virtual Network Function, a service and programmability framework, the drone delivery station, and the booster drone.

13. The computer-implemented method of claim 11, further comprising:
subsequent to a dissolution of the logical channel, sending, by the one or more processors, the booster drone to the drone delivery station; and
changing, by the one or more processors, a status of the booster drone to available to accept a second request to amplify a second mission critical workload to a second low earth orbit satellite.

14. A computer program product comprising:
one or more computer readable storage media and program instructions stored on the one or more computer readable storage media, the program instructions comprising:
responsive to receiving a first request to amplify a mission critical workload to a low earth orbit satellite from an edge device at a ground station, program instructions to initiate a targeted service instance;
program instructions to obtain a level of mission criticality of the first request by mapping the first request against a registry of applications and a respective level of mission criticality of the applications;
program instructions to select a booster drone from a drone delivery station;
program instructions to determine a first geo-location from where a satellite data communication needs to be initiated;
sending the booster drone to the first geo-location;
responsive to the booster drone reaching the first geo-location, program instructions to determine a second geo-location of the low earth orbit satellite to where the satellite data communication needs to be pushed;
program instructions to generate one or more signal strength requirements based on a first set of factors; and
program instructions to amplify, using the booster drone, the mission critical workload according to the one or more generated signal strength requirements, to the low earth orbit satellite.

15. The computer program product of claim 14, wherein amplifying the mission critical workload according to the one or more generated signal strength requirements further comprises:
program instructions to create a tunnel of 5G Dedicated Traffic Channel for a secured data communication transfer method; and
program instructions to send the mission critical workload to the second geo-location of the low earth orbit satellite.

16. The computer program product of claim 15, further comprising:
subsequent to sending the mission critical workload to the second geo-location of the low earth orbit satellite, program instructions to monitor an input data stream for a determination of validity of the mission critical workload sent to the second geo-location of the low earth orbit satellite.

17. The computer program product of claim 16, wherein monitoring the input data stream for the determination of the validity of the mission critical workload sent to the second geo-location of the low earth orbit satellite further comprises:
program instructions to send a signal from a service orchestration layer to one or more stakeholders;
responsive to the signal being received by the one or more stakeholders, program instructions to transfer an edge device to a static transmission line; and
program instructions to dissolve a logical channel.

18. A computer system comprising:
one or more computer processors;
one or more computer readable storage media;
program instructions collectively stored on the one or more computer readable storage media for execution by at least one of the one or more computer processors, the stored program instructions comprising:
responsive to receiving a first request to amplify a mission critical workload to a low earth orbit satellite from an edge device at a ground station, program instructions to initiate a targeted service instance;
program instructions to obtain a level of mission criticality of the first request by mapping the first request against a registry of applications and a respective level of mission criticality of the applications;
program instructions to select a booster drone from a drone delivery station;
program instructions to determine a first geo-location from where a satellite data communication needs to be initiated;
sending the booster drone to the first geo-location;
responsive to the booster drone reaching the first geo-location, program instructions to determine a second geo-location of the low earth orbit satellite to where the satellite data communication needs to be pushed;
program instructions to generate one or more signal strength requirements based on a first set of factors; and
program instructions to amplify, using the booster drone, the mission critical workload according to the one or more generated signal strength requirements, to the low earth orbit satellite.

19. The computer system of claim 18, wherein amplifying the mission critical workload according to the one or more generated signal strength requirements further comprises:
program instructions to create a tunnel of 5G Dedicated Traffic Channel for a secured data communication transfer method; and
program instructions to send the mission critical workload to the second geo-location of the low earth orbit satellite.

20. The computer system of claim 18, further comprising:
subsequent to sending the mission critical workload to the second geo-location of the low earth orbit satellite, program instructions to monitor an input data stream for a determination of validity of the mission critical workload sent to the second geo-location of the low earth orbit satellite.

* * * * *